Feb. 19, 1929. 1,702,683
G. CLAUDE
PURIFICATION OF COKE OVEN GASES AND THE LIKE
Filed March 12, 1923
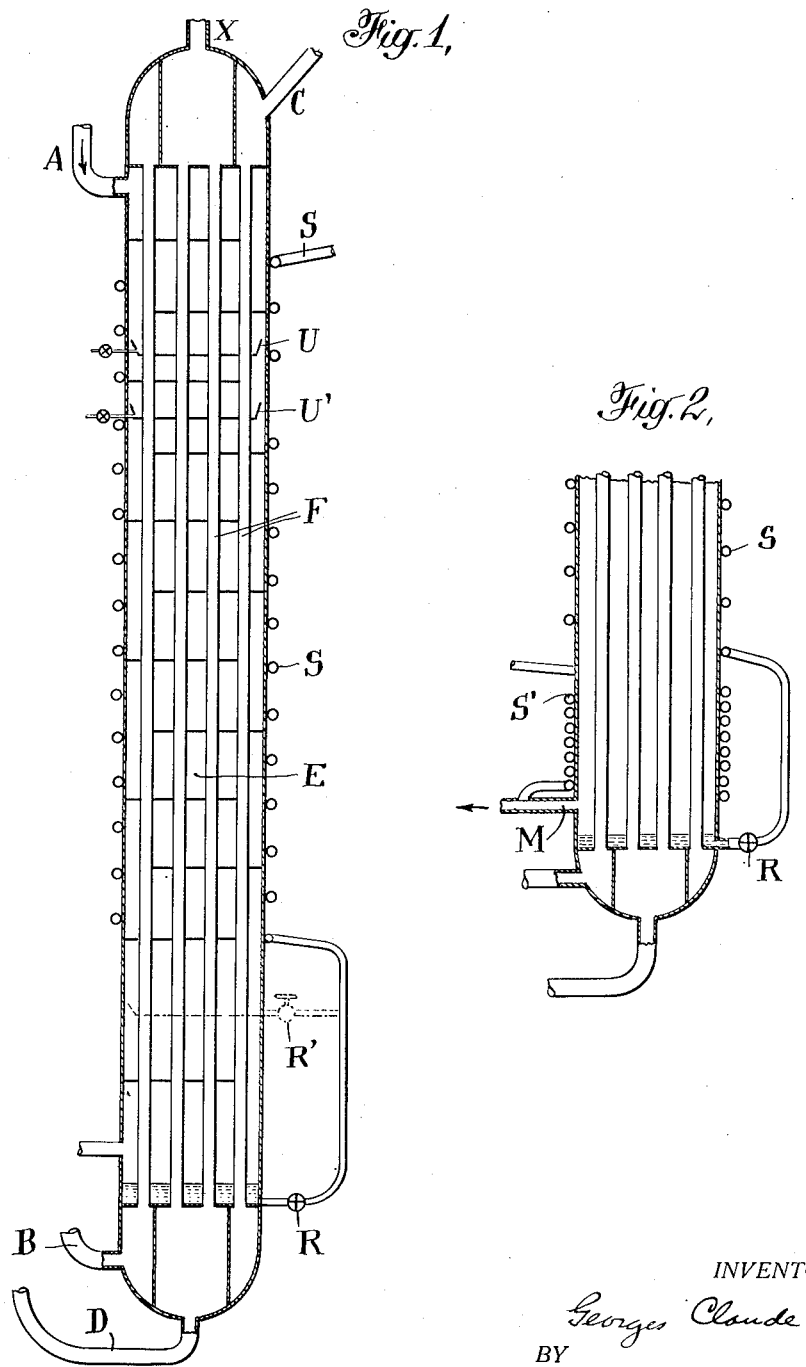
INVENTOR
Georges Claude
BY
Pennie Davis Marvin & Edmonds
his ATTORNEYS Patented Feb. 19, 1929.

1,702,683

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

PURIFICATION OF COKE-OVEN GASES AND THE LIKE.

Application filed March 12, 1923, Serial No. 624,669, and in France March 30, 1922.

This invention relates to the preliminary purification of illuminating or coal gas or coke oven gases intended to be subjected to partial liquefaction for the separation of their various constituents and in particular to the manufacture of hydrogen as a result of the said partial liquefaction process.

The purification of coke oven gas with a view to its treatment by a partial liquefaction process presents a very complex problem owing to the numerous constituents of this gas. These different constituents which liquefy and solidify at very diverse temperatures ranging from the temperature of the surrounding air to that of liquid air, would, if they were not eliminated or their solidification prevented, rapidly lead to choking up of the exchanger or the separating apparatus, and even if only one of these said constituents were to escape one or other of these alternatives, it would be sufficient to affect detrimentally the operation of the apparatus.

In order to overcome the difficulties above referred to there are two methods which may be used separately or in combination. The first of these consists in purifying physically or chemically, and to a high degree, the gases to be treated prior to their arrival at the exchangers preceding the liquefaction apparatus. The chemical method however is rendered difficult by the multiplicity of reagents that would be necessitated owing to the diversity of the impurities, whilst the physical method (elimination by solution at the temperature of the surrounding air) allows in general of the existance of the whole or part of the vapour tension.

The second alternative consists in allowing these impurities to reach the exchangers preceding the separating apparatus, but this must be done in such a way that none of them can be deposited in the exchangers excepting in a condition which will permit of easy extraction, that is to say in a liquid form.

This second alternative has been found to be much simpler in application than might have been assumed when the operation is conducted in accordance with the present invention. The gases, preferably after drying and the removal of carbon dioxide, sulphur compounds and benzol under pressure, are delivered to the exchanger and sujected therein to successively lower temperatures while the various constituents (which appear successively in liquid form during the cooling of the compressed gas to the temperature of liquefaction of methane and carbon monoxide and which, if permitted to flow alone towards the lower temperature region of the exchanger, would there become solidified) meet in the said lower temperature regions of the exchanger the other constituents which are liquefied successively at the lower temperatures and require still lower temperatures for solidification. Now all these substances are to a considerable extent miscible with one another, and owing to the presence in the liquids formed of sufficiently large proportions of the most volatile constituents, namely ethylene and methane, these different substances during their progressive admixture in the course of the cooling form non-congealable and limpid liquids down to temperatures of about $-160°$ C. or $-170°$ C. In this way all these liquids can be eliminated en bloc towards the bottom of the exchanger without fear of its obstruction and their passage into the separating apparatus proper, where their progressive accumulation would eventually result in their solidification, is very easily prevented. These liquids can be heated again in the exchanger before being withdrawn.

In order that the invention may be clearly understood and readily carried into effect the same will now be described more fully with reference to the accompanying drawings, in which:—

Figure 1 illustrates by way of example one construction of an exchanger which easily permits of the application of the present process, and Figure 2 illustrates a modified construction of the lower part of the exchanger.

The gases to be treated, after they have been dried and freed from carbon-di-oxide sulphur compounds and benzol under pressure, are admitted through A into the exchanger E round the tubes of the tubular nest F through which tubes the hydrogen, nitrogen, carbon monoxide and methane which have been previously separated pass from the bottom to the top; the first of these gases circulates from B to C and the others from D to X. In proportion as they descend, the gases under treatment become cooled, the most condensable substances becoming liquefied and also descending towards regions where they would be able to solidify if they were present alone, but owing to the appearance of other less congealable substances in a liquid state they are held in solution until they reach the bottom of the exchanger where there collects a mass of liquid for the most part non-congealable which is drawn off in proportion as it accumulates by the cock R and reheated by passage through the coil S, after which it is collected and utilized. In this reheating by passage through the coil S the less volatile constituents such as pentane are carried along towards the warmer end of the exchanger without it being necessary to vaporize them.

If the proportion of methane in the liquids thus collected at the bottom of the exchanger should be too large, which would be detrimental to the calorific balance and the working of the separating apparatus proper, it would be necessary in such case to withdraw liquids less rich in methane from a little higher stage of the exchanger by means of a device shown in dotted lines at R'. In this case the withdrawal at R may be dispensed with so that the methane liquefied at the bottom of the exchanger is carried along together with the residual gases to the separating apparatus. If this methane should contain a little ethylene, this would not cause any inconvenience from the point of view of obstruction of the separating apparatus, because, at the boiling temperature of methane, ethylene possesses a sufficient vapour tension to prevent it accumulating to the point of entailing its solidification. It will however be understood that it is preferable for the greatest portion of the ethylene to be collected with the liquids extracted at R or R' as it constitutes a substance of great value. For this purpose it is easy to modify the apparatus, if it be desired, in such manner as to collect separately the successive substances condensed during the course of the cooling process. For this purpose it suffices to place at suitable heights collectors similar to R provided with draw-off cocks and, if necessary, with tubular reheating systems similar to the coil S.

If gases which are relatively less cold have to be taken off at a suitable point of the exchanger for the purpose of feeding a liquefier and to promote the efficiency of an expansion with external work, as described for example in the specification of English Patent No. 175,605, these gases would not be deprived of the troublesome constituents condensed below the level of the point of "off-take" and operation would soon be stopped by obstructions. In order to overcome this difficulty it suffices for feeding the liquefier to take a part of the gases deprived of liquids passing out at M at the bottom of the exchanger (see Figure 2) first of all heating them, for example in the coil S' before passing them into the liquefier.

Owing to this process of progressive condensation and elimination towards the cold end of the exchanger of all the troublesome constituents of the gases under treatment together with a little methane, there hardly passes into the separating apparatus proper (which may be of any suitable type such, for example, as that described in the specification of English Patent No. 174,327) anything save a mixture of the essential constituents methane, carbon mon-oxide, nitrogen and hydrogen, and it may be a little ethylene, so that operations can be continued for a long time without any stoppage due to the occurrence of solidification. The process according to the present invention is, it will be understood, of general application in the treatment of ordinary coal gas or coke oven gases, quite independently of the particular form of the exchangers employed.

On the other hand, instead of first removing and retaining the water by chemical means, there may be added to the gases to be treated, prior to their admission to the exchanger, a small quantity of alcohol which will there become vaporized. Owing to the presence of this alcohol, the water vapour will be dissolved, in proportion to the cooling, in liquids of a more and more non-congealable nature which, being collected in proportion to their production in the collectors U, U' (see Figure 1), can be discharged to the exterior in the same proportion by means of corresponding cocks.

Claims:

1. A process for the preliminary purification by cold of gaseous mixtures containing hydrogen, such as coal gas or coke oven gas, intended to be subjected to partial liquefaction, which process consists in passing the compressed mixture of gases to be treated, subsequent to its having been dried and freed from carbon dioxide, sulphur compounds and benzol, and before the mixture is subjected to the final separation, in heat exchange relation with a cooling medium, in such manner that the liquids which are successively formed are allowed to intermingle and flow towards progressively colder regions, the whole of the liquid so obtained being withdrawn under substantially the same pressure as that of the compressed mixture of gases and independently of the residual unliquefied portion thereof and reheated by means of heat derived from the entering gases.

2. A process for the preliminary purification by cold of gaseous mixtures containing hydrogen, such as coal gas or coke oven gas, intended to be subjected to partial liquefaction, which process consists in passing the compressed mixture of gases to be treated, subsequent to its having been dried and freed from carbon dioxide, sulphur compounds and benzol, and before the mixture is subjected to the final separation, in heat exchange relation with a cooling medium, in such manner that the liquids which are successively formed are allowed to intermingle and flow towards progressively colder regions, separately collecting the liquids so obtained, withdrawing them under substantially the same pressure as that of the compressed mixture of gases and independently of the residual unliquefied portion thereof and reheating them by means of heat derived from the entering gases.

3. A process for the preliminary purification by cold of gaseous mixtures containing hydrogen, such as coal gas or coke oven gas, intended to be subjected to partial liquefaction, which process consists in passing the compressed mixture of gases to be treated, subsequent to its having been dried and freed from carbon dioxide, sulphur compounds and benzol, and before the mixture is subjected to the final separation, in heat exchange relation with a cooling medium, in such manner that the liquids which are successively formed are allowed to intermingle and flow towards progressively colder regions, removing those liquids, withdrawing from the coldest region part of the cooled gases under substantially the same pressure as that of the compressed mixture of gases, reheating it to a desired extent by heat exchange with succeeding portions of the gases at a higher temperature and finally liquefying such part of the gases.

GEORGES CLAUDE.